US012668368B2

(12) United States Patent
Terwilliger et al.

(10) Patent No.: US 12,668,368 B2
(45) Date of Patent: *Jun. 30, 2026

(54) HYBRID GAS TURBINE ENGINE STARTING CONTROL

(71) Applicant: RTX Corporation, Farmington, CT (US)

(72) Inventors: Neil Terwilliger, Meriden, CT (US); Gary Collopy, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 62 days.

This patent is subject to a terminal disclaimer.

(21) Appl. No.: 18/151,652

(22) Filed: Jan. 9, 2023

(65) Prior Publication Data

US 2023/0160358 A1 May 25, 2023

Related U.S. Application Data

(63) Continuation of application No. 16/936,602, filed on Jul. 23, 2020, now Pat. No. 11,549,464.

(Continued)

(51) Int. Cl.
*B64D 31/18* (2024.01)
*B64D 27/33* (2024.01)
(Continued)

(52) U.S. Cl.
CPC ............. *B64D 27/33* (2024.01); *B64D 31/18* (2024.01); *F01D 19/00* (2013.01); *F02C 7/275* (2013.01); *F02C 7/32* (2013.01); *F05D 2270/023* (2013.01)

(58) Field of Classification Search
None
See application file for complete search history.

(56) References Cited

U.S. PATENT DOCUMENTS 4,541,237 A * 9/1985 Dickey ..................... F02C 9/28
60/39.281
5,212,943 A * 5/1993 Harris ....................... F02C 9/28
60/790

(Continued)

FOREIGN PATENT DOCUMENTS

EP         2452878 A2     5/2012
EP         2889452 A1     7/2015
(Continued)

OTHER PUBLICATIONS

EP Application No. 20187728.9 Extended EP Search Report dated Dec. 23, 2020, 6 pages.

*Primary Examiner* — Devon C Kramer
*Assistant Examiner* — Marc Amar
(74) *Attorney, Agent, or Firm* — CANTOR COLBURN LLP

(57) ABSTRACT

A system includes a gas turbine engine of an aircraft, the gas turbine engine having a low speed spool, a high speed spool, and a combustor. The system also includes a low spool motor configured to augment rotational power of the low speed spool and a high spool motor configured to augment rotational power of the high speed spool. The system further includes a controller configured to cause fuel flow. The controller is configured to control a thrust response of the gas turbine engine to a thrust target between zero and a thrust level to move the aircraft during engine start and during engine idle. The controller is also configured to control the low spool motor to drive rotation of the low speed spool responsive to a thrust command while the controller does not command fuel flow to the combustor.

16 Claims, 5 Drawing Sheets

Related U.S. Application Data

(60) Provisional application No. 62/878,439, filed on Jul. 25, 2019.

(51) Int. Cl.
  F01D 19/00 (2006.01)
  F02C 7/275 (2006.01)
  F02C 7/32 (2006.01)

(56) References Cited

U.S. PATENT DOCUMENTS

| | | | |
|---|---|---|---|
| 7,285,871 B2 | 10/2007 | Derouineau | |
| 7,468,561 B2 * | 12/2008 | Kern | H02P 9/302 |
| | | | 290/4 A |
| 7,980,509 B2 * | 7/2011 | Bhargava | B64D 41/00 |
| | | | 244/50 |
| 8,727,270 B2 | 5/2014 | Burns et al. | |
| 8,955,335 B2 | 2/2015 | Burns | |
| 9,601,970 B2 | 3/2017 | French et al. | |
| 10,090,676 B2 | 10/2018 | Knowles et al. | |
| 10,641,179 B2 * | 5/2020 | Hayama | F02C 7/262 |
| 11,549,464 B2 * | 1/2023 | Terwilliger | F02C 7/36 |
| 2005/0056021 A1 | 3/2005 | Belokon et al. | |
| 2006/0042252 A1 | 3/2006 | Derouineau | |
| 2006/0225431 A1 | 10/2006 | Kupratis | |
| 2012/0000204 A1 * | 1/2012 | Kesseli | F02C 3/107 |
| | | | 60/778 |
| 2012/0119020 A1 * | 5/2012 | Burns | F02C 7/36 |
| | | | 244/58 |
| 2012/0317973 A1 * | 12/2012 | Gulen | F01K 23/065 |
| | | | 60/39.182 |
| 2013/0031912 A1 | 2/2013 | Finney et al. | |
| 2014/0084677 A1 | 3/2014 | Haillot | |
| 2015/0148994 A1 * | 5/2015 | Nagashima | B64D 31/06 |
| | | | 701/3 |
| 2015/0159499 A1 * | 6/2015 | Bacic | F01D 11/20 |
| | | | 700/287 |
| 2016/0305346 A1 * | 10/2016 | Kawai | F02C 9/18 |
| 2017/0008618 A1 * | 1/2017 | Cox | B64C 25/405 |
| 2017/0190441 A1 * | 7/2017 | Mackin | F01D 15/10 |
| 2017/0335795 A1 * | 11/2017 | Klemen | H02K 5/203 |
| 2018/0002025 A1 * | 1/2018 | Lents | F02K 3/06 |
| 2018/0216526 A1 | 8/2018 | Dalal et al. | |
| 2018/0354632 A1 * | 12/2018 | Hon | B64D 31/06 |
| 2019/0001955 A1 * | 1/2019 | Gansler | B64D 27/24 |
| 2019/0002113 A1 | 1/2019 | Gansler et al. | |
| 2019/0002115 A1 | 1/2019 | Miller et al. | |
| 2019/0250058 A1 * | 8/2019 | Schofield | F01D 17/08 |
| 2019/0375512 A1 * | 12/2019 | Ribeiro | B64D 27/24 |
| 2020/0157966 A1 * | 5/2020 | Huang | F02C 7/32 |
| 2020/0277063 A1 | 9/2020 | Thomassin et al. | |
| 2020/0292503 A1 | 9/2020 | Klaassen et al. | |
| 2020/0392924 A1 * | 12/2020 | Turner | F02K 3/075 |
| 2021/0025339 A1 | 1/2021 | Terwilliger et al. | |
| 2021/0039802 A1 * | 2/2021 | Chesneau | B64C 29/0016 |
| 2021/0054788 A1 | 2/2021 | Kupratis et al. | |
| 2021/0362862 A1 * | 11/2021 | Jaljal | B64D 31/00 |

FOREIGN PATENT DOCUMENTS

| | | |
|---|---|---|
| EP | 3190052 A1 | 7/2017 |
| WO | 2007053932 A1 | 5/2007 |
| WO | 2018211227 A1 | 11/2018 |

* cited by examiner

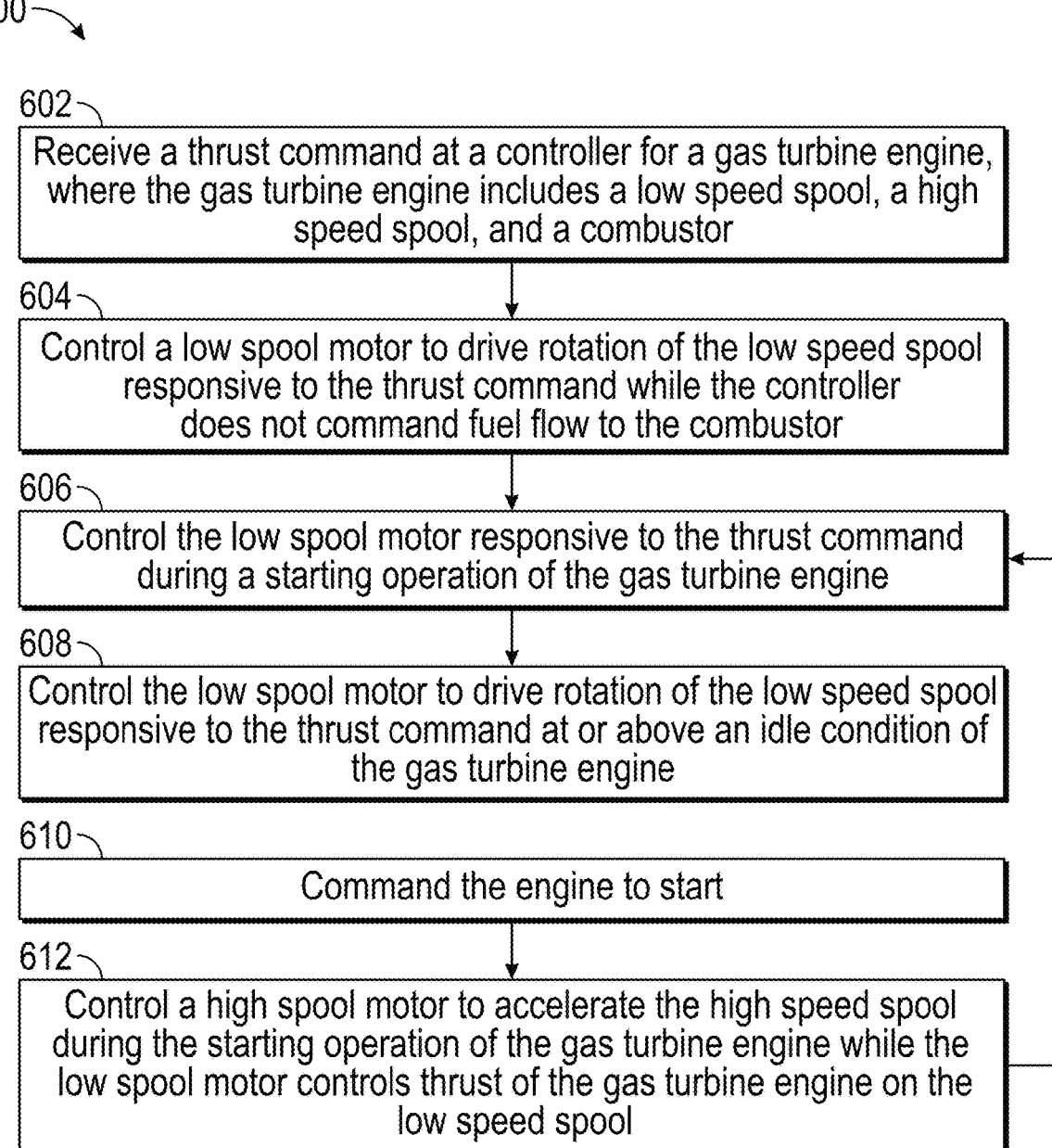

600

602
Receive a thrust command at a controller for a gas turbine engine, where the gas turbine engine includes a low speed spool, a high speed spool, and a combustor 604
Control a low spool motor to drive rotation of the low speed spool responsive to the thrust command while the controller does not command fuel flow to the combustor 606
Control the low spool motor responsive to the thrust command during a starting operation of the gas turbine engine 608
Control the low spool motor to drive rotation of the low speed spool responsive to the thrust command at or above an idle condition of the gas turbine engine 610
Command the engine to start 612
Control a high spool motor to accelerate the high speed spool during the starting operation of the gas turbine engine while the low spool motor controls thrust of the gas turbine engine on the low speed spool

FIG. 6

HYBRID GAS TURBINE ENGINE STARTING CONTROL

CROSS-REFERENCE TO RELATED APPLICATIONS

This application is a continuation of U.S. application Ser. No. 16/936,602 filed Jul. 23, 2020 which claims the benefit of U.S. Provisional Application No. 62/878,439 filed Jul. 25, 2019, the disclosures of which are incorporated herein by reference in their entirety.

BACKGROUND

The subject matter disclosed herein generally relates to rotating machinery and, more particularly, to a method and an apparatus for a hybrid gas turbine engine starting control.

Gas turbine engines are typically inefficient to operate at low power settings. Operation of a gas turbine engine at idle is the typical lowest power setting available once the gas turbine engine has been started. In some instances, thrust produced at idle may be greater than the thrust needed for ground-based operations, such as taxiing and waiting in a parked position prior to takeoff or after landing. This can result in excess fuel consumption and may reduce engine component life with many repeated taxi, takeoff, and landing cycles.

In a hybrid gas turbine engine, an electric motor can be available to assist the gas turbine engine operation by adding rotational force to a spool of the gas turbine engine while fuel flow to the gas turbine engine is reduced below idle or shut off. Such a configuration can result in non-intuitive control from a pilot perspective, depending on how the two energy sources, fuel and electricity, are expected to be managed through the range of aircraft operation. In some control configurations, during operations such as engine start, thrust control may not be available to the pilot.

BRIEF DESCRIPTION

According to one embodiment, a system includes a gas turbine engine having a low speed spool, a high speed spool, and a combustor. The system also includes a low spool motor configured to augment rotational power of the low speed spool. The system further includes a controller configured to cause fuel flow, and the controller is operable to control the low spool motor to drive rotation of the low speed spool responsive to a thrust command while the controller does not command fuel flow to the combustor.

In addition to one or more of the features described above or below, or as an alternative, further embodiments may include where the controller is further operable to control the low spool motor responsive to the thrust command during a starting operation of the gas turbine engine.

In addition to one or more of the features described above or below, or as an alternative, further embodiments may include a high spool motor configured to augment rotational power of the high speed spool, where the controller is configured to control the high spool motor to accelerate the high speed spool during the starting operation of the gas turbine engine while the low spool motor controls thrust of the gas turbine engine on the low speed spool.

In addition to one or more of the features described above or below, or as an alternative, further embodiments may include where the starting operation includes a ground-based start or an in-flight restart.

In addition to one or more of the features described above or below, or as an alternative, further embodiments may include a low spool generator configured to extract power from the low speed spool and a high spool generator configured to extract power from the high speed spool.

In addition to one or more of the features described above or below, or as an alternative, further embodiments may include where the controller is configured to selectively provide electrical power from the low spool generator to the high spool motor and selectively provide electrical power from the high spool generator to the low spool motor.

In addition to one or more of the features described above or below, or as an alternative, further embodiments may include where the controller is configured to selectively engage either or both of the low spool generator and the high spool generator to adjust a load and speed of either or both of the low speed spool and the high speed spool.

In addition to one or more of the features described above or below, or as an alternative, further embodiments may include where the controller is operable to control the low spool motor to drive rotation of the low speed spool responsive to the thrust command at or above an idle condition of the gas turbine engine.

In addition to one or more of the features described above or below, or as an alternative, further embodiments may include where the controller is configured to determine an allocation of the thrust command between commanding fuel flow to the combustor and electric current to the low spool motor based on an operating state of the gas turbine engine and a throttle lever angle.

In addition to one or more of the features described above or below, or as an alternative, further embodiments may include where the controller is configured to control a thrust response of the gas turbine engine to a response profile based on the throttle lever angle using any combination of the low spool motor, a high spool motor configured to augment rotational power of the high speed spool, and fuel burn.

According to an embodiment, a method includes receiving a thrust command at a controller for a gas turbine engine, where the gas turbine engine includes a low speed spool, a high speed spool, and a combustor. The controller is configured to cause fuel flow, and the controller is operable to control a low spool motor to drive rotation of the low speed spool responsive to the thrust command while the controller does not command fuel flow to the combustor, where the low spool motor is configured to augment rotational power of the low speed spool.

In addition to one or more of the features described above or below, or as an alternative, further embodiments may include receiving a thrust command at a controller configured to cause fuel flow for a gas turbine engine, where the gas turbine engine includes a low speed spool, a high speed spool, and a combustor. The controller can control a low spool motor to drive rotation of the low speed spool responsive to the thrust command while the controller does not command fuel flow to the combustor, where the low spool motor is configured to augment rotational power of the low speed spool.

In addition to one or more of the features described above or below, or as an alternative, further embodiments may include controlling the low spool motor responsive to the thrust command during a starting operation of the gas turbine engine.

In addition to one or more of the features described above or below, or as an alternative, further embodiments may include controlling a high spool motor to accelerate the high speed spool during the starting operation of the gas turbine engine while the low spool motor controls thrust of the gas turbine engine on the low speed spool, where the high spool motor is configured to augment rotational power of the high speed spool.

In addition to one or more of the features described above or below, or as an alternative, further embodiments may include selectively providing electrical power from the low spool generator to the high spool motor, and selectively providing electrical power from the high spool generator to the low spool motor.

In addition to one or more of the features described above or below, or as an alternative, further embodiments may include selectively engaging either or both of the low spool generator and the high spool generator to adjust a load and speed of either or both of the low speed spool and the high speed spool.

In addition to one or more of the features described above or below, or as an alternative, further embodiments may include controlling the low spool motor to drive rotation of the low speed spool responsive to the thrust command at or above an idle condition of the gas turbine engine.

In addition to one or more of the features described above or below, or as an alternative, further embodiments may include determining an allocation of the thrust command between commanding fuel flow to the combustor and electric current to the low spool motor based on an operating state of the gas turbine engine and a throttle lever angle, and controlling the low spool motor and the gas turbine engine based on the allocation.

In addition to one or more of the features described above or below, or as an alternative, further embodiments may include controlling a thrust response of the gas turbine engine to a response profile based on the throttle lever angle using any combination of the low spool motor, a high spool motor configured to augment rotational power of the high speed spool, and fuel burn.

A technical effect of the apparatus, systems and methods is achieved by performing hybrid gas turbine engine starting control.

BRIEF DESCRIPTION OF THE DRAWINGS

The following descriptions should not be considered limiting in any way. With reference to the accompanying drawings, like elements are numbered alike:

FIG. 6 is a flow chart illustrating a method, in accordance with an embodiment of the disclosure.

DETAILED DESCRIPTION

A detailed description of one or more embodiments of the disclosed apparatus and method are presented herein by way of exemplification and not limitation with reference to the Figures.

Figure 1:
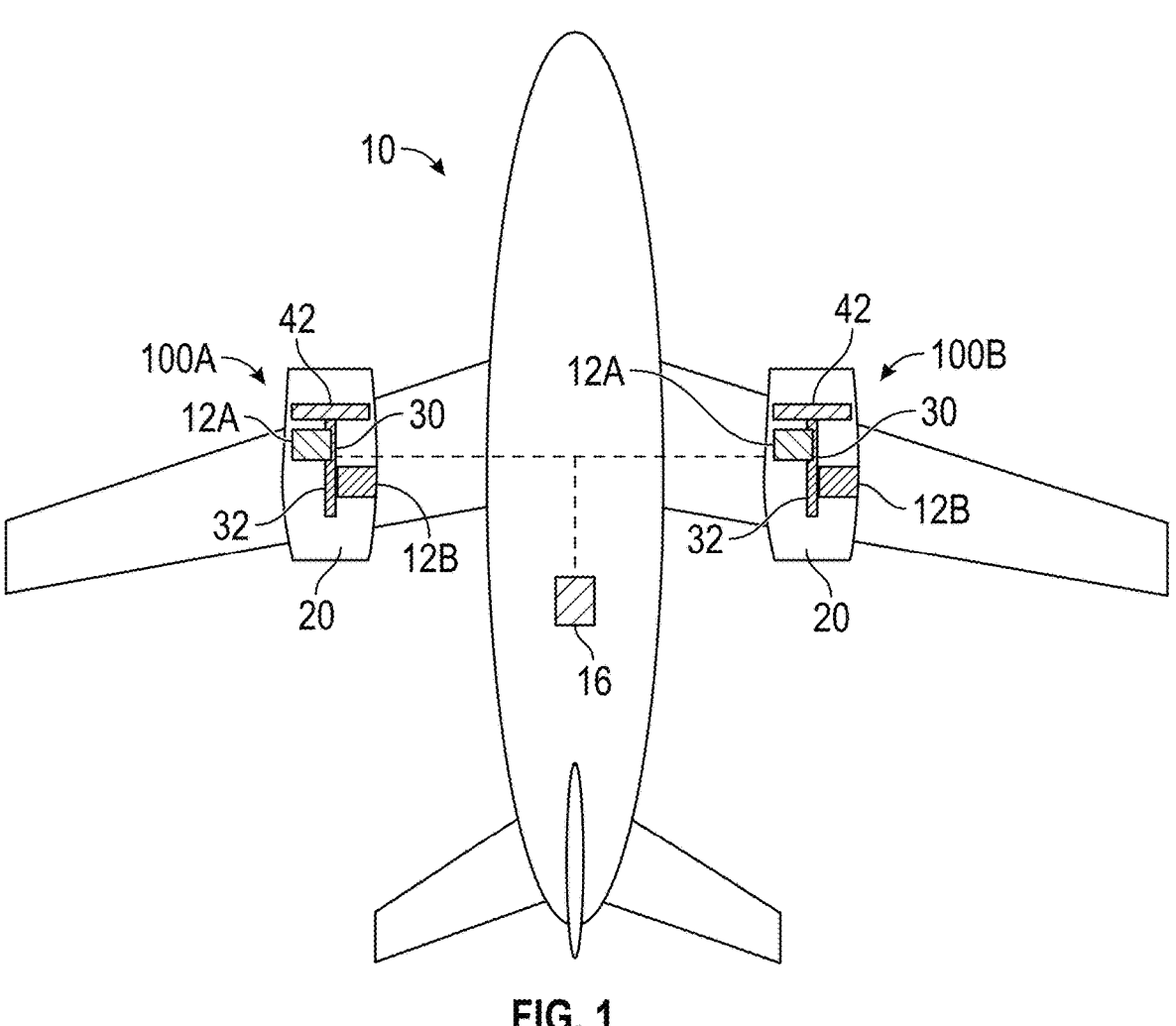
FIG. 1 is a schematic diagram of an aircraft including dual hybrid electric propulsions systems, in accordance with an embodiment of the disclosure.

FIG. 1 schematically illustrates an aircraft 10 that includes a pair of hybrid electric propulsion systems 100A, 100B (also referred to as hybrid gas turbine engines 100A, 100B or hybrid propulsion systems 100A, 100B). Each of the hybrid electric propulsion systems 100A, 100B includes a gas turbine engine 20 with a low speed spool 30 configured to drive rotation of a fan 42. Gas turbine engine 20 also includes a high speed spool 32 that operates at higher speeds and pressures than the low speed spool 30. A low spool motor 12A is configured to augment rotational power of the low speed spool 30. A high spool motor 12B can be configured to augment rotational power of the high speed spool 32. At least one power source 16 of the aircraft 10 can provide electrical power to the low spool motor 12A and/or to the high spool motor 12B. The power source 16 can be a stored energy source or a generator driven by an engine. For example, the power source 16 can include one or more of a battery, a super capacitor, an ultra capacitor, a fuel cell, a flywheel, and the like. Where the aircraft 10 includes an additional thermal engine (not depicted), such as an auxiliary power unit, the power source 16 can be a generator driven by the thermal engine. Further, a generator of one of the hybrid electric propulsion systems 100A, 100B can provide power to the other hybrid electric propulsion systems 100A, 100B. For example, if the hybrid electric propulsion system 100A is combusting fuel, the hybrid electric propulsion system 100B may operate without burning fuel and can drive the low speed spool 30 based on the low spool motor 12A receiving electric power from the hybrid electric propulsion system 100A and/or the power source 16. Further, the high speed spool 32 can be driven based on the high spool motor 12B receiving electric power from the hybrid electric propulsion system 100A and/or the power source 16.

While the example of FIG. 1 illustrates a simplified example of the gas turbine engine 20, it will be understood that any number of spools, and inclusion or omission of other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
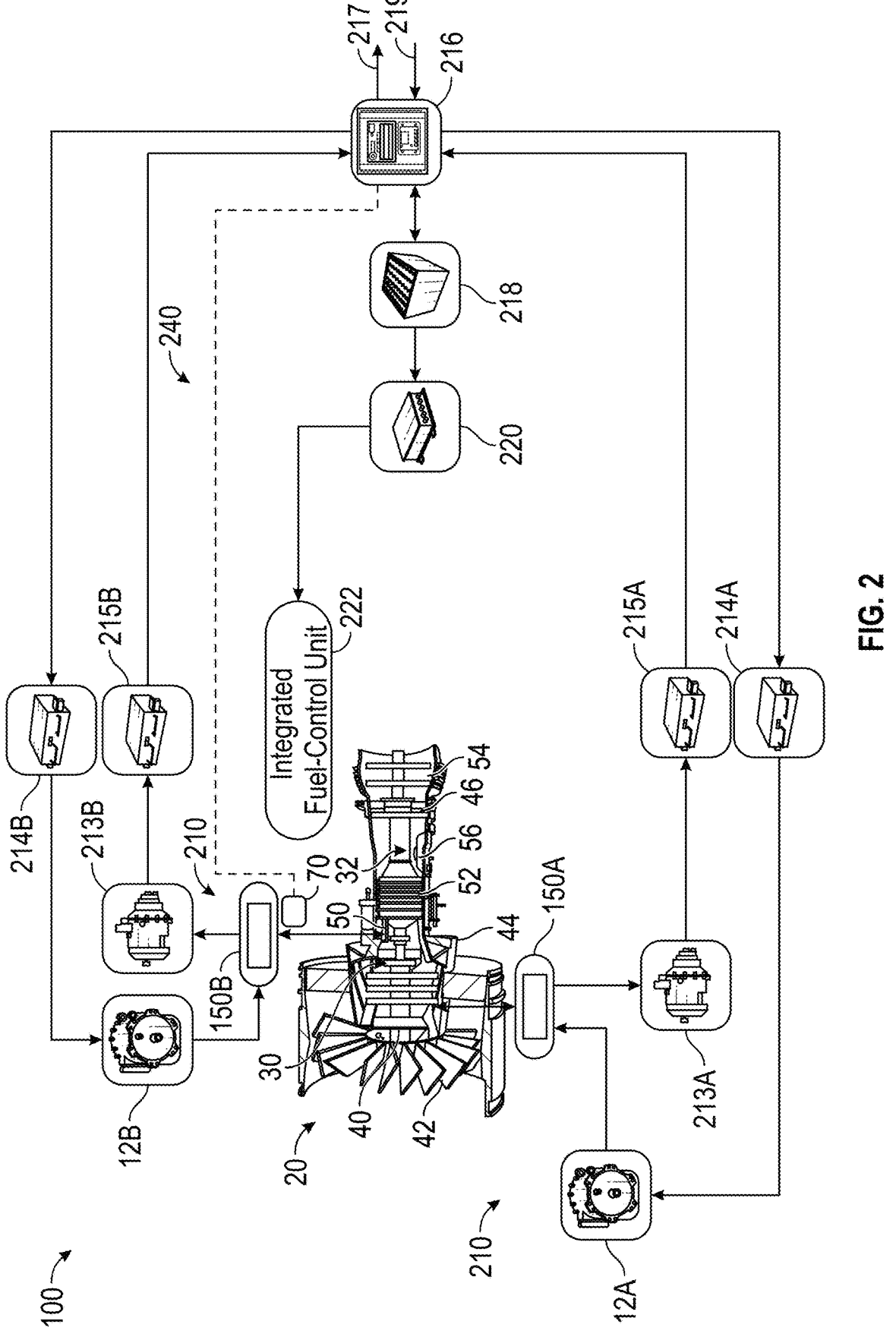
FIG. 2 is a schematic diagram of a hybrid electric propulsion system, in accordance with an embodiment of the disclosure.

FIG. 2 illustrates a hybrid electric propulsion system 100 (also referred to as hybrid gas turbine engine 100 or hybrid propulsion system 100) as a further example of the hybrid electric propulsion system 100A, 100B of FIG. 1. In the example of FIG. 2, the hybrid electric propulsion system 100 includes gas turbine engine 20 operably coupled to an electrical power system 210 as part of a hybrid electric aircraft, such as aircraft 10 of FIG. 1. One or more mechanical power transmissions 150 (e.g., 150A, 150B) can be operably coupled between the gas turbine engine 20 and the electrical power system 210. The gas turbine engine 20 includes one or more spools, such as low speed spool 30 and high speed spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50). The electrical power system 210 can include a low spool motor 12A configured to augment rotational power of the low speed spool 30 and a high spool motor 12B configured to augment rotational power of the high speed spool 32. Although two motors 12A, 12B are depicted in FIG. 2, it will be understood that there may be only a single motor (e.g., only low spool motor 12A) or additional motors (not depicted). Further, the motors 12A, 12B can be electric motors or alternate power sources may be used, such as hydraulic motors, pneumatic motors, and other such types of motors known in the art. The electrical power system 210 can also include a low spool generator 213A configured to convert rotational power of the low speed spool 30 to electric power and a high spool generator 213B configured to convert rotational power of the high speed spool 32 to electric power. Although two electric generators 213A, 213B (generally referred to as generators 213A, 213B) are depicted in FIG. 2, it will be understood that there may be only a single electric generator (e.g., only electric generator 213B) or additional electric generators (not depicted). In some embodiments, one or more of the motors 12A, 12B can be configured as a motor or a generator depending upon an operational mode or system configuration, and thus one or more of the electric generators 213A, 213B may be omitted.

In the example of FIG. 2, the mechanical power transmission 150A includes a gearbox operably coupled between the inner shaft 40 and a combination of the low spool motor 12A and low spool generator 213A. The mechanical power transmission 150B can include a gearbox operably coupled between the outer shaft 50 and a combination of the high spool motor 12B and high spool generator 213B. In embodiments where the motors 12A, 12B are configurable between a motor and generator mode of operation, the mechanical power transmission 150A, 150B can include a clutch or other interfacing element(s).

The electrical power system 210 can also include motor drive electronics 214A, 214B operable to condition current to the motors 12A, 12B (e.g., DC-to-AC converters). The electrical power system 210 can also include rectifier electronics 215A, 215B operable to condition current from the electric generators 213A, 213B (e.g., AC-to-DC converters). The motor drive electronics 214A, 214B and rectifier electronics 215A, 215B can interface with an energy storage management system 216 that further interfaces with an energy storage system 218. The energy storage management system 216 can be a bi-directional DC-DC converter that regulates voltages between energy storage system 218 and electronics 214A, 214B, 215A, 215B. The energy storage system 218 can include one or more energy storage devices, such as a battery, a super capacitor, an ultra capacitor, and the like. The energy storage management system 216 can facilitate various power transfers within the hybrid electric propulsion system 100. The energy storage management system 216 may also transfer power to one or more electric motors on the engine, or to external loads 217 and receive power from one or more external power sources 219 (e.g., power source 16 of FIG. 1, aircraft power, auxiliary power unit power, cross-engine power, and the like).

A power conditioning unit 220 and/or other components can be powered by the energy storage system 218. The power conditioning unit 220 can distribute electric power to support actuation and other functions of the gas turbine engine 20. For example, the power conditioning unit 220 can power an integrated fuel control unit 222 to control fuel flow to the gas turbine engine 20. The power conditioning unit 220 can also power a plurality of actuators (not depicted), such as bleed actuators, vane actuators, and the like.

One or more accessories 70 can also be driven by or otherwise interface with the gas turbine engine 20. Examples of accessories 70 can include oil pumps, fuel pumps, and other such components. As one example, the accessories 70 include an oil pump driven through gearing, such as mechanical power transmission 150B, in response to rotation of the high speed spool 32 and/or the high spool motor 12B. Alternatively, accessories 70 can be electrically driven through power provided by the energy storage management system 216 or other such sources of electrical power.

Engagement and operation of the low spool motor 12A, low spool generator 213A, high spool motor 12B, and high spool generator 213B can change depending upon an operating state of the gas turbine engine 20 and any commands received. Collectively, any effectors that can change a state of the gas turbine engine 20 and/or the electrical power system 210 may be referred to as hybrid electric system control effectors 240. Examples of the hybrid electric system control effectors 240 can include the motors 12A, 12B, electric generators 213A, 213B, integrated fuel control unit 222, and/or other elements (not depicted).

Figure 3:
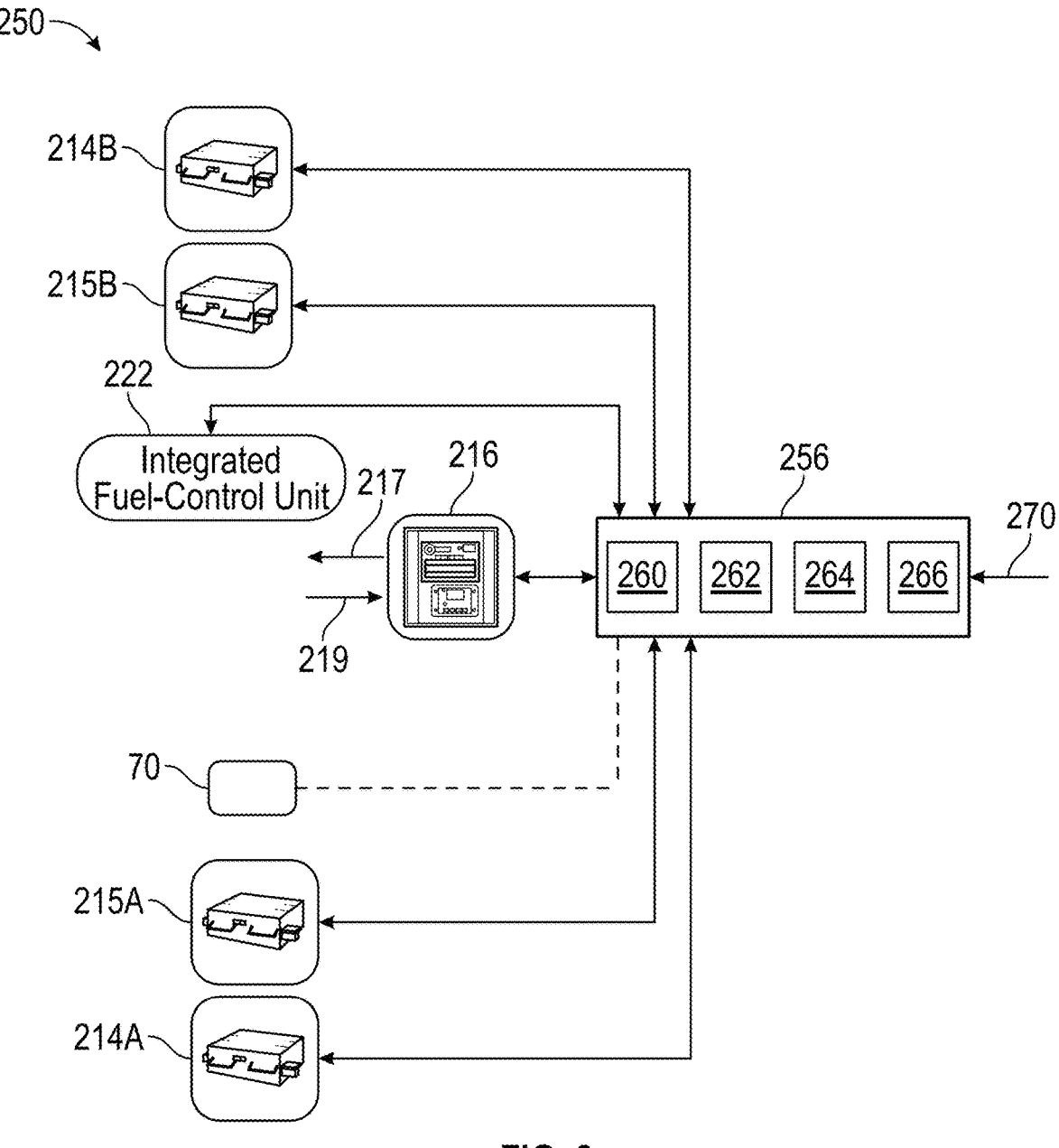
FIG. 3 is a schematic diagram of control signal paths of a hybrid electric propulsion system, in accordance with an embodiment of the disclosure.

FIG. 3 is a schematic diagram of control signal paths 250 of the hybrid electric propulsion system 100 of FIG. 2 and is described with continued reference to FIGS. 1 and 2. A controller 256 can interface with the motor drive electronics 214A, 214B, rectifier electronics 215A, 215B, energy storage management system 216, integrated fuel control unit 222, accessories 70, and/or other components (not depicted) of the hybrid electric propulsion system 100. In embodiments, the controller 256 can control and monitor for fault conditions of the gas turbine engine 20 and/or the electrical power system 210. For example, the controller 256 can be integrally formed or otherwise in communication with a full authority digital engine control (FADEC) of the gas turbine engine 20. Alternatively, the controller 256 can be an aircraft level control or be distributed between one or more systems of the aircraft 10 of FIG. 1. In embodiments, the controller 256 can include a processing system 260, a memory system 262, and an input/output interface 264. The controller 256 can also include various operational controls, such as a hybrid engine control 266 that controls the hybrid electric system control effectors 240 further described herein, for instance, based on a thrust command 270. The thrust command 270 can be a throttle lever angle or a command derived based on a throttle lever angle control of the aircraft 10 of FIG. 1.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 214A, 214B, rectifier electronics 215A, 215B, energy storage management system 216, integrated fuel control unit 222, accessories 70, and/or other components (not depicted) of the hybrid electric propulsion system 100. The controller 256 provides a means for controlling the hybrid electric system control effectors 240 using a hybrid engine control 266 that can be dynamically updated during operation of the hybrid electric propulsion system 100. The means for controlling the hybrid electric system control effectors 240 can be otherwise subdivided, distributed, or combined with other control elements.

The controller 256 with hybrid engine control 266 can apply control laws and access/update models to determine how to control and transfer power between the low speed spool 30 and high speed spool 32. For example, sensed and/or derived parameters related to speed, flow rate, pressure ratios, temperature, thrust, and the like can be used to establish operational schedules and transition limits to maintain efficient operation of the gas turbine engine 20. For instance, a mode of operation of the gas turbine engine 20, such as idle, takeoff, climb, cruise, and descent can have different power settings, thrust requirements, flow requirements, and temperature effects. The hybrid engine control 266 can control electric current provided to the low spool motor 12A and high spool motor 12B and loading effects of the low spool generator 213A and high spool generator 213B. The hybrid engine control 266 can also determine a power split between delivering fuel to the combustor 56 and using the low spool motor 12A and/or high spool motor 12B to power rotation within the gas turbine engine 20.

Figures 4, 5:
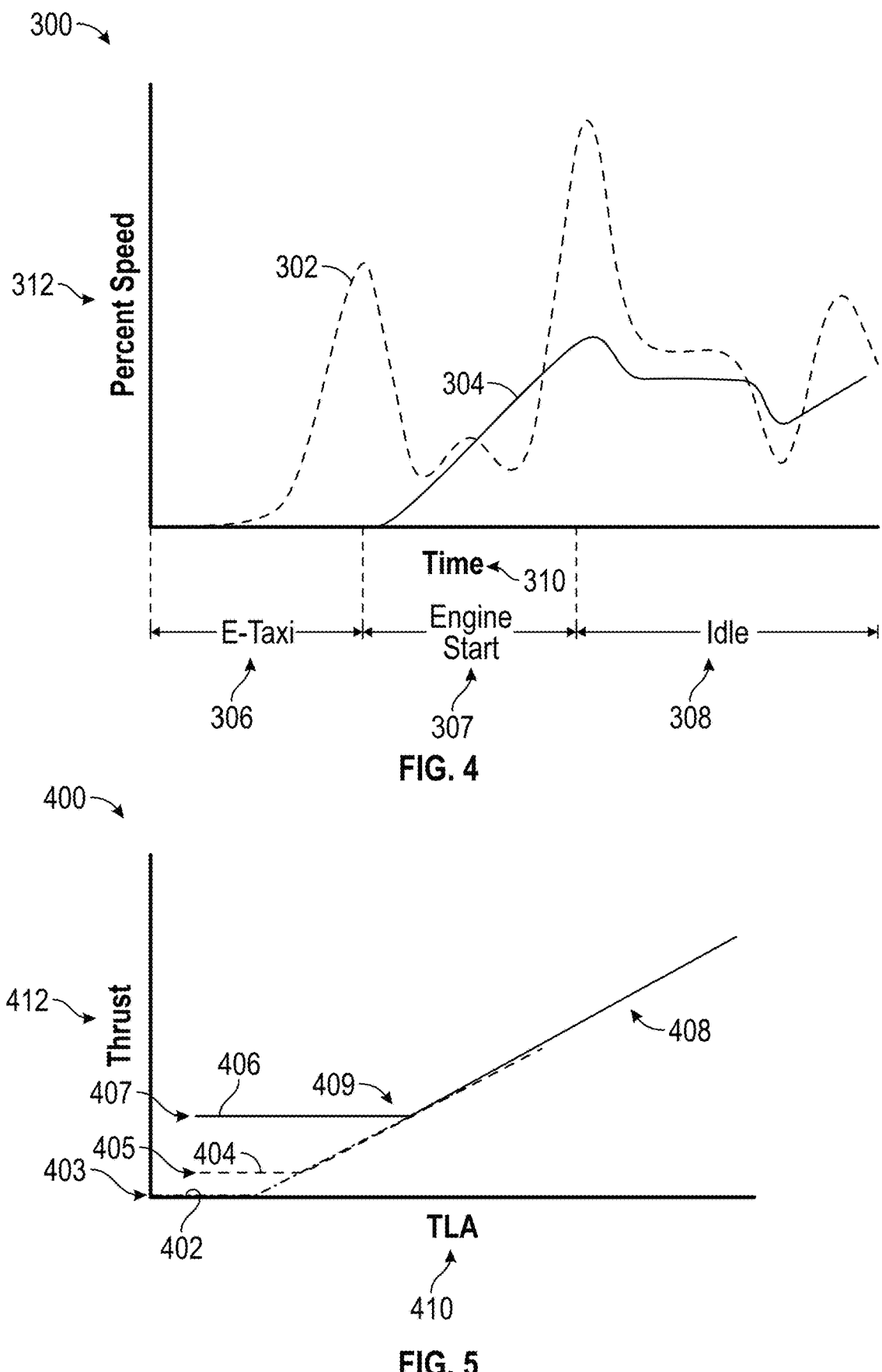
FIG. 4 is a plot that graphically illustrates a relationship between engine spool speeds and time when transitioning through multiple operating modes, in accordance with an embodiment of the disclosure.
FIG. 5 is a plot that graphically illustrates a relationship between thrust and throttle lever angle, in accordance with an embodiment of the disclosure.

Referring now to FIG. 4, plot 300 graphically illustrates a relationship between engine spool speeds and time when transitioning through multiple operating modes. Line 302 indicates a percent speed 312 of the low speed spool 30 as time 310 advances and the hybrid electric propulsion system 100 transitions between e-taxi 306, engine start 307, and conventional idle 308. E-taxi 306 refers to a mode of operation where the low spool motor 12A drives rotation of the low speed spool 30 to produce thrust using the fan 42, such that the aircraft 10 can be maneuvered on the ground without burning fuel in the combustor 56. Line 304 indicates a percent speed 312 of the high speed spool 32 as time 310 advances and the hybrid electric propulsion system 100 transitions between e-taxi 306, engine start 307, and conventional idle 308. As can be seen in FIG. 4, the high speed spool 32 can remain undriven during e-taxi mode 306, which conserves energy by avoiding fuel burn and power draw from the high spool motor 12B. In engine start 307, the high spool motor 12B can be used to increase the speed of the high speed spool 32 for light off and fuel burn in the combustor 56. In conventional idle 308, the motors 12A, 12B may not be needed, and the gas turbine engine 20 may be power by fuel burn. Alternatively, the engine-on idle state may include a further hybrid element where the idle state of the engine includes both fuel input and electric input to the electric motors 12A, 12B, or draw through the electric generators 213A, 213B. This is referred to as sub-idle, being possibly below conventional fuel-only idle in terms of either fuel flow and/or thrust.

Referring now to FIG. 5, plot 400 graphically illustrates a relationship between thrust 412 and throttle lever angle (TLA) 410. Line 402 depicts an example thrust response starting at the e-taxi mode 306 of FIG. 4, where thrust 412 can be commanded below idle by controlling the low spool motor 12A to drive rotation of the low speed spool 30 absent fuel burn in the combustor 56. Generally, the operating mode of line 402 is for fuel off and electricity available as limited by a lower operating limit 403. The lower operating limit 403 may be associated with a fuel-off detent of the TLA 410. An idle level 407 may be associated with an idle detent of the TLA 410. Line 404 depicts an example of a thrust response during engine start 307 of FIG. 3, where thrust 412 can be provided below an idle level 407 using the low spool motor 12A to control thrust 412 while also using the high spool motor 12B to control the high speed spool 32 to provide sufficient compression in the gas turbine engine 20 for light off in the combustor 56. Line 406 depicts an example of a thrust response after starting the gas turbine engine 20 at idle level 407, such as idle 308 of FIG. 4. Controlling the low spool motor 12A and high spool motor 12B can support a sub-idle operation state with thrust control at power settings lower than idle level 407. Thrust 12 can be controlled at a demand and power output via the low spool motor 12A and/or high spool motor 12B for a thrust output less than a minimum thrust output at engine idle. The thrust response depicted at line 406 can start at idle level 407 and continue up in relation to TLA 410 along a response profile 408. Although lines 402, 404, 406 and response profile 408 are depicted as substantially linear segments, it will be understood that lines 402, 404, 406 and response profile 408 can have other shapes and characteristics.

FIG. 5 further illustrates a first region 409 where the thrust response characteristic above the idle level 407 may be the same whether the fuel flow is on or off, and furthermore a second region 405 is defined below the idle level 407. The similar thrust response characteristic can continue in the second region 405 to a lower thrust level before reaching the lower operating limit 403 at line 402. A transition from the lower operating limit 403 to the idle level 407 can occur during engine start at line 404. Line 404 is an example that can shift in position between lines 402 and 406 depending on the throttle lever angle 410 position for sub-idle operation. Power provided by the low spool motor 12A and/or the high spool motor 12B can support engine starting below idle level 407 within the second region 405.

In embodiments, the controller 256 can blend the power distribution between the hybrid electric system control effectors 240 and fuel burn in the combustor 56. From a pilot's perspective, the setting of throttle lever angle 410 produces thrust command 270 without the pilot having to distinguish between whether motor-based thrust or fuel burn based thrust is needed. While conventional systems may use detents to prevent a pilot from reducing thrust 412 below the idle level 407, embodiments can support operation of thrust 412 down to line 402 to support e-taxi mode 306 and other intermediate modes of operation below conventional idle 308. Thus, control of thrust 412 can be achieved before, during, and after engine start 307. With respect to the aircraft 10, the hybrid electric propulsion systems 100A, 100B can be independently controlled such that one of the hybrid electric propulsion systems 100A, 100B is operating in a fuel burning mode while the other of the hybrid electric propulsion systems 100A, 100B is operated using the low spool motor 12A and/or the high spool motor 12B or a blend of fuel burn and electric power. Such mixed modes of operation may be used, for instance, during descent of the aircraft 10, where thrust 412 is desired from both gas turbine engines 20, but only one of the gas turbine engines 20 actively burns fuel. Further, embodiments can support e-taxi mode 306 with warmup time to delay starting of the gas turbine engines 20 until reaching a location on the taxiway away from a boarding gate.

Referring now to FIG. 6 with continued reference to FIGS. 1-5, FIG. 6 is a flow chart illustrating a method 600 for providing hybrid gas turbine engine starting control, in accordance with an embodiment. The method 600 may be performed, for example, by the hybrid electric propulsion system 100 of FIG. 2. For purposes of explanation, the method 600 is described primarily with respect to the hybrid electric propulsion system 100; however, it will be understood that the method 600 can be performed on other configurations (not depicted).

Method 600 pertains to the controller 256 executing embedded code for the starting and thrust control using hybrid engine control 266 along with other control functions. At block 602, the controller 256 can receive a thrust command 270 for a gas turbine engine 20, where the gas turbine engine 20 includes a low speed spool 30, a high speed spool 32, and a combustor 56. The controller 256 is configured to cause fuel flow to the combustor 56 under certain operating conditions.

At block 604, the controller 256 can control a low spool motor 12A to drive rotation of the low speed spool 30 responsive to the thrust command 270 while the controller 256 does not command fuel flow to the combustor 56, where the low spool motor 12A is configured to augment rotational power of the low speed spool 30. Fuel flow can be reduced or completely shut off depending upon an operating state of the gas turbine engine 20. For example, the controller 256 can output a command of no fuel, fuel flow off, and/or otherwise effectively disable or reduce fuel flow as targeted. The operating state can depend on a combination of commands, conditions, and modes, such as an e-taxi mode, a starting mode, a ground idle mode, a takeoff mode, a climb mode, a cruise mode, an in-flight idle mode, a descent mode, a landing mode, and other such modes. The controller 256 can determine an allocation of the thrust command 270 between commanding fuel flow to the combustor 56 and electric current to the low spool motor 12A based on the operating state of the gas turbine engine 20 and a throttle lever angle 410, where the throttle lever angle 410 can be received from a pilot control, an auto-pilot control, or other such source on the aircraft 10. The low spool motor 12A can be powered by one or more of a generator, an energy storage system, and a power source 16 external to the gas turbine engine 20.

At block 606, the controller 256 can control the low spool motor 12A responsive to the thrust command 270 during a starting operation of the gas turbine engine 20. The starting operation can be a ground-based start or an in-flight restart.

At block 608, the controller 256 can control the low spool motor 12A to drive rotation of the low speed spool 30 responsive to the thrust command at or above an idle condition of the gas turbine engine 20.

In some embodiments, a high spool motor 12B can be used in conjunction with the low spool motor 12A. For example, the controller 256 can receive an engine start command 610. At block 612, the controller 256 can control a high spool motor 12B to accelerate the high speed spool 32 responsive to a start command while the low spool motor 12A controls thrust of the gas turbine engine 20 on the low speed spool 30, where the high spool motor 12B is configured to augment rotational power of the high speed spool 32. Control of the high spool motor 12B of block 612 can occur in parallel with control of the low spool motor 12A of block 604 or blocks 604 and 612 can be other sequenced, combined, or further subdivided. The controller 256 can be configured to control a thrust response of the gas turbine engine 20 to a response profile 408 based on the throttle lever angle 410 using any combination of the low spool motor 12A, high spool motor 12B, and fuel burn.

In some embodiments, a low spool generator 213A is configured to extract power from the low speed spool 30, and a high spool generator 213B is configured to extract power from the high speed spool 32. The controller 256 can be configured to selectively provide electrical power from the low spool generator 213A to the high spool motor 12B and selectively provide electrical power from the high spool generator 213B to the low spool motor 12A. The controller 256 can also be configured to selectively engage either or both of the low spool generator 213A and the high spool generator 213B to adjust a load and speed of either or both of the low speed spool 30 and the high speed spool 32.

While the above description has described the flow process of FIG. 6 in a particular order, it should be appreciated that unless otherwise specifically required in the attached claims that the ordering of the steps may be varied. Also, it is clear to one of ordinary skill in the art that, the starting control described herein can be combined with and enhance other control features, such as valves, vanes, and fuel flow control.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system of an aircraft, the system comprising:
   a gas turbine engine comprising a fan, a low speed spool comprising a low pressure compressor and a low pressure turbine coupled to an inner shaft, a high speed spool comprising a high pressure compressor and a high pressure turbine coupled to an outer shaft, and a combustor;
   a low spool motor configured to augment rotational power of the low speed spool, wherein the low spool motor is coupled to a first mechanical power transmission that is coupled between the inner shaft and the low spool motor;
   a high spool motor configured to augment rotational power of the high speed spool, wherein the high spool motor is coupled to a second mechanical power transmission that is coupled between the outer shaft and the high spool motor; and
   a controller configured to cause fuel flow, the controller configured to:
      control a thrust response of the gas turbine engine to a thrust target between zero and a thrust level to move the aircraft during engine start and during engine idle;
      control the low spool motor to drive rotation of the low speed spool responsive a thrust command to produce thrust by the fan while the controller does not command fuel flow to the combustor in an e-taxi mode;

control the low spool motor to drive rotation of the low speed spool responsive to the thrust command to produce thrust by the fan during a starting operation, wherein the starting operation includes driving rotation of the high speed spool and initiation of fuel flow and combustion, and wherein during control of the fuel flow during the starting operation in a starting mode the low spool motor is controlled to achieve a target thrust response using a throttle lever angle at a power setting lower than an idle level between a lower operating limit associated with a fuel-off detent of the throttle lever angle and the idle level associated with an idle detent of the throttle lever angle; and control the high spool motor to accelerate the high speed spool during the starting operation of the gas turbine engine and provide compression for light off in the combustor while the low spool motor controls thrust of the gas turbine engine on the low speed spool in the starting mode.

2. The system of claim 1, wherein the starting operation comprises a ground-based start or an in-flight restart.

3. The system of claim 1, further comprising:

a low spool generator configured to extract power from the low speed spool, wherein the low spool generator is coupled to the first mechanical power transmission; and a high spool generator configured to extract power from the high speed spool, wherein the high spool generator is coupled to the second mechanical power transmission.

4. The system of claim 3, wherein the controller is configured to: selectively provide electrical power from the low spool generator to the high spool motor by controlling a first rectifier electronics to condition current from the low spool generator to power motor drive electronics of the high spool motor.

5. The system of claim 4, wherein the controller is configured to: selectively provide electrical power from the high spool generator to the low spool motor by controlling a second rectifier electronics to condition current from the high spool generator to power motor drive electronics of the low spool motor.

6. The system of claim 5, wherein the electrical power selection from the low spool generator and the high spool generator is based on one or more operational schedules and transition limits to maintain operation of the gas turbine engine.

7. The system of claim 6, wherein the controller is configured to selectively engage either or both of the low spool generator and the high spool generator to adjust a load and speed of either or both of the low speed spool and the high speed spool through a first gearbox of the first mechanical power transmission and a second gearbox of the second mechanical power transmission wherein the selective engagement is based on the one or more operational schedules and transition limits to maintain operation of the gas turbine engine.

8. The system of claim 1, wherein controller is operable to control the low spool motor to drive rotation of the low speed spool responsive to the thrust command at or above engine idle.

9. A method comprising:

receiving a thrust command at a controller, the controller configured to cause fuel flow for a gas turbine engine of an aircraft, the gas turbine engine comprising a low speed spool comprising a low pressure compressor and a low pressure turbine coupled to an inner shaft, a fan driven by the low speed spool, a high speed spool comprising a high pressure compressor and a high pressure turbine coupled to an outer shaft, and a combustor;

determining, by the controller, an allocation of the thrust command between commanding fuel flow to the combustor and electric current to a low spool motor based on an operating state of the gas turbine engine and a throttle lever angle wherein the low spool motor is coupled to a first mechanical power transmission that is coupled between the inner shaft and the low spool motor;

controlling, by the controller, a thrust response of the gas turbine engine to a thrust target between zero and a thrust level to move the aircraft during engine start and during engine idle;

controlling, by the controller, the low spool motor to drive rotation of the low speed spool responsive the thrust command to produce thrust by the fan while the controller does not command fuel flow to the combustor in an e-taxi mode;

controlling, by the controller, the low spool motor to drive rotation of the low speed spool responsive to the thrust command to produce thrust by the fan during a starting operation, wherein the starting operation includes driving rotation of the high speed spool and initiation of fuel flow and combustion, wherein during control of the fuel flow during the starting operation in a starting mode the low spool motor is controlled to achieve a target thrust response using the throttle lever angle at a power setting lower than an idle level between a lower operating limit associated with a fuel-off detent of the throttle lever angle and an idle level associated with an idle detent of the throttle lever angle; and controlling a high spool motor to accelerate the high speed spool during the starting operation of the gas turbine engine and provide compression for light off in the combustor while the low spool motor controls thrust of the gas turbine engine on the low speed spool in the starting mode, wherein the high spool motor is coupled to a second mechanical power transmission that is coupled between the outer shaft and the high spool motor.

10. The method of claim 9, wherein the starting operation comprises a ground-based start or an in-flight restart.

11. The method of claim 9, wherein a low spool generator is configured to extract power from the low speed spool, and a high spool generator is configured to extract power from the high speed spool, wherein the low spool generator is coupled to the first mechanical power transmission, and the high spool generator is coupled to the second mechanical power transmission.

12. The method of claim 11, further comprising:

selectively providing electrical power from the low spool generator to the high spool motor.

13. The method of claim 12, further comprising:

selectively providing electrical power from the high spool generator to the low spool motor.

14. The method of claim 13, further comprising:

selectively engaging either or both of the low spool generator and the high spool generator to adjust a load and speed of either or both of the low speed spool and the high speed spool through a first gearbox of the first mechanical power transmission and a second gearbox of the second mechanical power transmission.

15. The method of claim 14, wherein the selectively engaging either or both of the low spool generator and the high spool generator is based on one or more operational schedules and transition limits to maintain operation of the gas turbine engine.

16. The method of claim 9, further comprising:

controlling the low spool motor to drive rotation of the low speed spool responsive to the thrust command at or above engine idle.

\* \* \* \* \*